July 15, 1952            A. E. HALL            2,603,164

TRACK MAGNETIZING WHEEL

Filed June 4, 1948            2 SHEETS—SHEET 1

INVENTOR,
Allen E. Hall.
BY
E. E. Vrooman & Co.,
ATTORNEYS.

July 15, 1952          A. E. HALL          2,603,164

TRACK MAGNETIZING WHEEL

Filed June 4, 1948          2 SHEETS—SHEET 2

INVENTOR,
Allen E. Hall.
BY
E. E. Vrooman & Co.,
ATTORNEYS.

Patented July 15, 1952

2,603,164

UNITED STATES PATENT OFFICE 2,603,164

TRACK MAGNETIZING WHEEL

Allen E. Hall, Philadelphia, Pa.

Application June 4, 1948, Serial No. 31,012

2 Claims. (Cl. 105—78)

This invention relates to track magnetizing wheels.

An object of the invention is the provision of efficient means for magnetizing railway tracks, whereby a locomotive equipped with my improved wheel structure is able to pull a load as great as a much heavier locomotive.

Another object of the invention is the construction of wheels that will greatly relieve the tracks of great weight, because the wheels when magnetized will grip the rails, which is equivalent to the placing of a great amount of unnecessary weight on the wheels.

A still further object of the invention is the construction of magnetizing wheels that have a great attraction with respect to the rails of the track, whereby the locomotive or coach provided with these wheels may obtain high speed while at the same time the danger of a wreck, or of the locomotive and cars leaving the rail, will be greatly minimized.

Another object of this invention is to supply a sufficient number of magnetizing wheels under the locomotive and coaches to provide a powerful grip on the rails when applying the brakes, whereby the train can be stopped in a relatively short distance, without the wheels sliding on the rails.

With the foregoing and other objects in view, this invention comprises certain novel constructions, combinations and arrangements of parts as will be hereinafter fully described, illustrated in the accompanying drawings, and more particularly pointed out in the appended claims.

Figure 1:
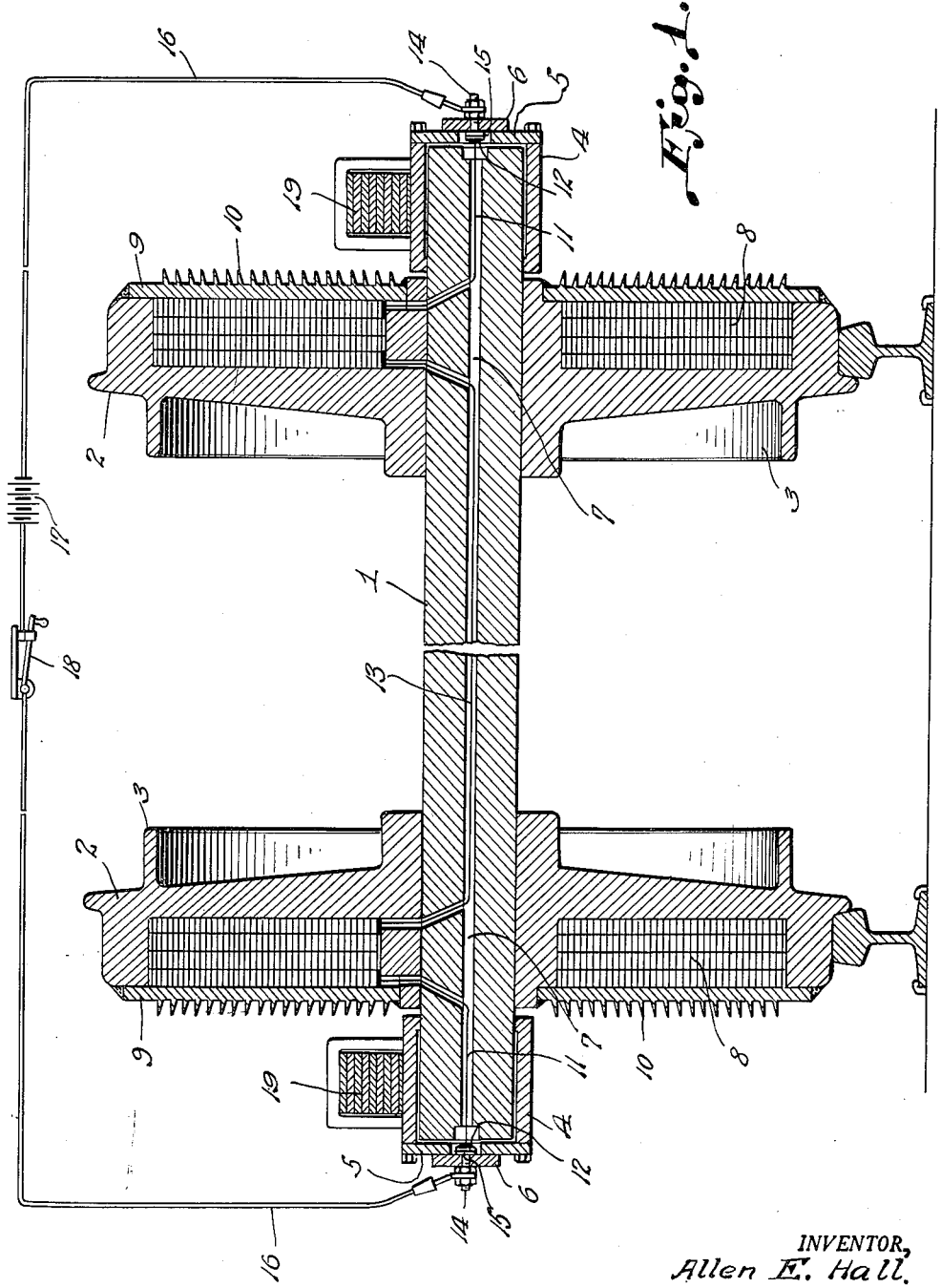
Figure 1 is a longitudinal, vertical, sectional view through the axle, showing two wheels in vertical section, of the preferred embodiment of this invention.

Referring to the drawings, and particularly to Figure 1 thereof, showing my preferred embodiment, 1 designates the axle, on which is secured, in any suitable manner the two wheels 2. Each wheel 2 is provided with a brake band 3, to which brake band any suitable brake means may be applied.

The axle 1 projects at its ends beyond the outer faces of the wheels 2. On these projecting ends are cylinder bearings 4; each cylinder bearing 4 has on its outer end a thrust plate 5, which is suitably secured to the cylinder bearings 4. The cylinder bearing 4 is made of non-metallic material. An insulated bolt plate 6 is suitably fastened to the thrust plate 5. The axle 1 is provided with a central passage 7 which registers with the center of said plates 5 and 6.

Each wheel 2 is provided with magnetic windings 8, and securely fastened to the body of the wheels 2 on its outer face, is a disc plate 9. This plate 9 is provided with outwardly extending cooling fins 10. In the central passage 7 of axle 1 is an insulated wire 11, which is connected at one end to the windings 8, and has on its outer end a contact head 12. The windings 8 of the two wheels are electrically connected by an insulated wire 13, which wire 13 extends through the central passage 7.

A bolt 14 is on the insulated bolt plate 6, and a head 15 is on said bolt 14, the head 15 being in contact with the head 12. Therefore, when the axle and its wheels are rotating, the head 12, at each end of the axle 1, will be rotating in slidable engagement with the head 15 on bolt 14, whereby perfect contact is made at all times. The two bolts 14 are connected through the insulated wires 16 to a suitable source of electricity, designated by numeral 17; a suitable switch 18 is provided in the circuit, and this switch 18 may be located at any convenient position on the locomotive or coaches, as the case may be.

A suitable lubricant can be placed in the cylinder bearings 4, around the axle 1.

A suitable hardening compound can be pumped in liquid condition into the central passage 7, which will form an excellent support for the insulated wires 11 and 13, whereby they are satisfactorily held in an operatable position. This hardening compound flows around the windings 8 in the wheels, whereby such windings are suitably supported, as well as insulated. This compound may consist of pitch mixed with pulverized mica, or any other common mixture that will produce a solidifying compound.

On the two cylinder bearings 4 are suitable spring units 19.

Figure 2:
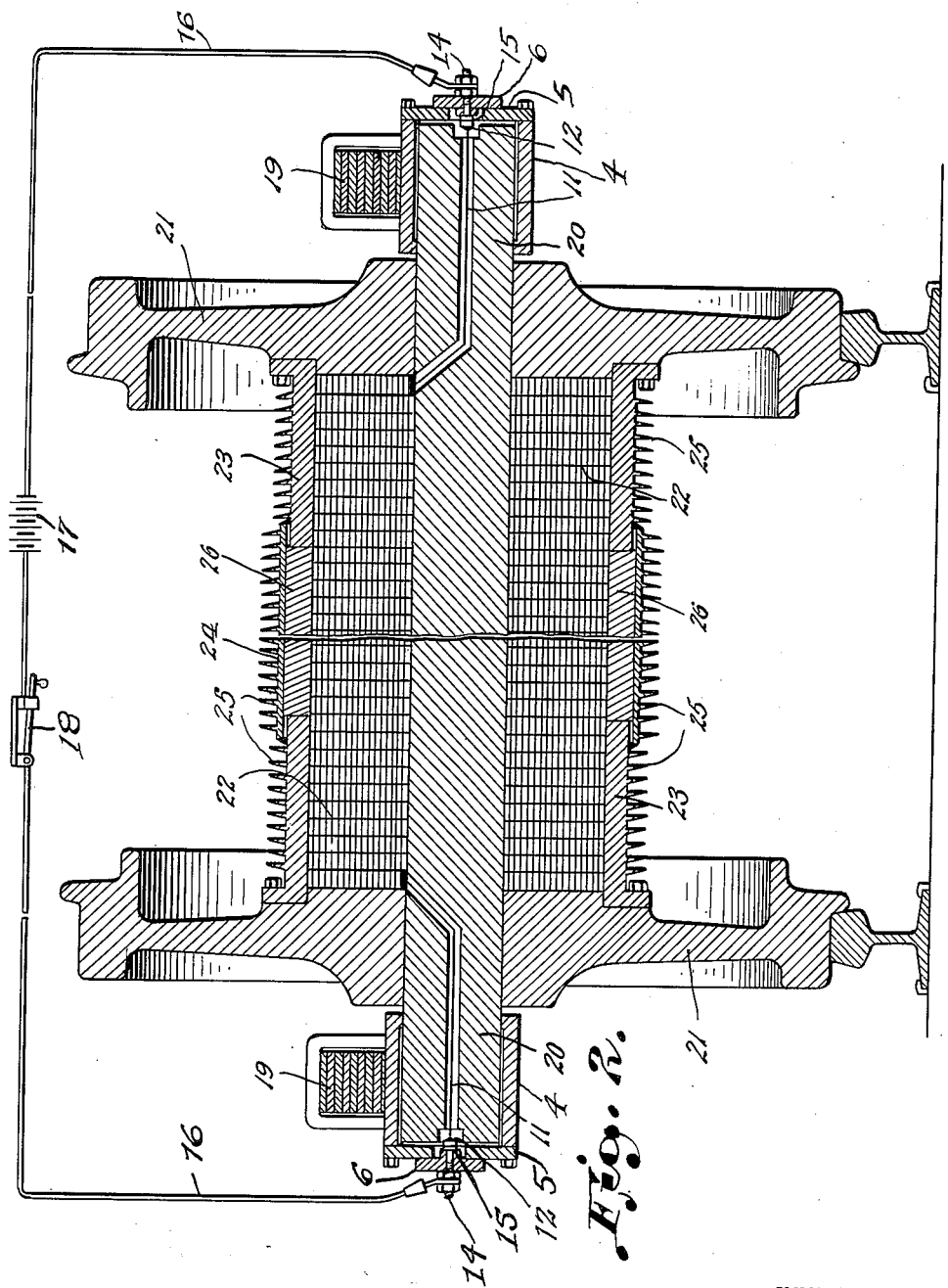
Figure 2 is a transverse, vertical, sectional view of another embodiment of this invention.

In the embodiment shown in Figure 2, the axle 20 is provided with two wheels 21, and each wheel is provided with an ordinary brake band 3. Around axle 20 is a magnetic winding 22, whereby the two wheels may be magnetized. A cylindrical cover 23 surrounds the winding 22 and is suitably connected at its ends to wheels 21. The cylindrical cover 23 is provided with a sectional center band 24. The cover 23 and band 24 are provided with cooling fins 25. The ends of axle 20 project beyond the outside of wheels 21, the same as with the preferred embodiment, Fig. 1. The insulated wires 11, Fig. 2, are connected at their inner ends to the windings 22, while their outer ends are formed with the contact heads 12, as with the wires 11 in Figure 1. The ends of axle 20 are provided with the same structure as shown and described for the preferred embodiment of this invention, Fig. 1. Therefore, it will be unnecessary to specifically describe the detailed end structures of axle 20 when this disclosure has hereinbefore been specifically set forth. Like in Fig. 1, the windings 22 and wires 11 are contacted and suspended in place by a hardening compound that is pumped, or otherwise injected into the wheel structure during its manufacture, or assembling.

By means of my invention, the operator can energize the wheels when he desires, or by throwing the switch, he can de-energize the wheels and the tracks.

Referring to Figure 2, at 26 is shown a hardened mass of compound that is the same as the hardened compound surrounding the entire windings 22, as well as suspending the wirings 11.

It is, of course, obvious that any of the rolling stock on which this invention is used will have at least two pair of axle connected wheels quite closely positioned on the usual pair of tracks. The winding shown, when applied to one pair of axle connected wheels will, when energized, have the effect of converting the pair of wheels and their axle into an electromagnet of bar magnet type having one pole at one wheel of the pair and the other pole at the other wheel of said pair. Under such conditions the connection, commonly called the "keeper," between the poles will comprise the wheels and axle of an adjacent pair of axle connected wheels and the lengths of the rails between the wheels of the first and second pairs. Thus a complete magnetic connection will exist between the poles of said first pair of wheels.

While I have described the preferred embodiments of my electro-magnetic traction device and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an article of railway rolling stock, a pair of wheels of magnetic material each having a hub, a disc and a rim projecting parallel to the hub and providing an annular recess between the hub and rim, said rims being formed to engage a pair of rails on which said wheels are mounted, an axle of like material connecting said hubs in metallic contact therewith, said axle having a main bore extending from end to end of the axle, said axle and the hubs having pairs of branch bores extending from the main bore to respective recesses, each wheel having a spirally wound conductive winding housed in the respective recess, conductors leading from the terminals of each winding through the branch bores to the main bore and along the latter, one of said conductors connecting the two windings and the other conductors leading out from the ends of the main bore for connection to a source of electric energy.

2. In an article of railway rolling stock, a pair of wheels of magnetic material each having a hub, a disc and a rim projecting parallel to the hub and providing an annular recess between the hub and rim, said rims being formed to engage a pair of rails on which said wheels are mounted, an axle of like material connecting said hubs in metallic contact therewith, said axle having a main bore extending from end to end of the axle, said axle and the hubs having pairs of branch bores extending from the main bore to respective recesses, each wheel having a spirally wound conductive winding housed in the respective recess, conductors leading from the terminals of each winding through the branch bores to the main bore and along the latter, one of said conductors connecting the two windings and the other conductors leading out from the ends of the main bore for connection to a source of electric energy, and cover plates fitted over said recesses and provided on their outer surfaces with cooling ribs.

ALLEN E. HALL.

REFERENCES CITED

The following references are of record in the file of this patent:

UNITED STATES PATENTS

| Number | Name | Date |
|---|---|---|
| 709,484 | Heinze | Sept. 23, 1902 |
| 710,691 | Hill | Oct. 7, 1902 |
| 804,371 | Behan | Nov. 14, 1905 |
| 1,007,473 | McCauley | Oct. 31, 1911 |
| 1,063,259 | Heinze | June 3, 1913 |
| 1,074,651 | Sessions | Oct. 7, 1913 |
| 1,181,505 | Colvin | May 2, 1916 |
| 1,411,206 | Dorion | Mar. 28, 1922 |
| 1,730,944 | Peterson et al. | Oct. 8, 1929 |
| 2,068,956 | LaBrie | Jan. 26, 1937 |
| 2,266,059 | Milan | Dec. 16, 1941 |